Patented Mar. 18, 1924.

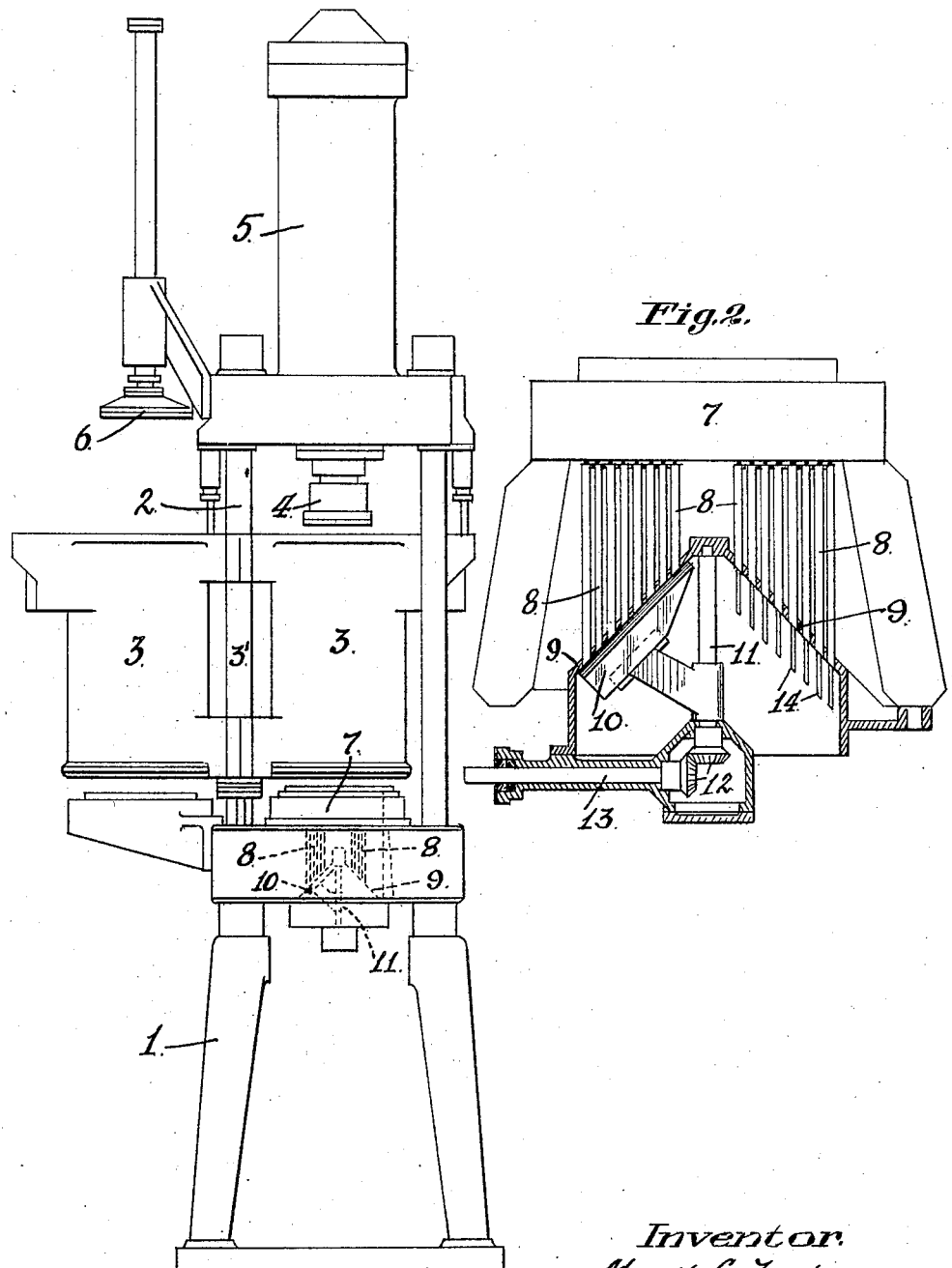

1,487,323

UNITED STATES PATENT OFFICE.

MARK E. FONTANA, OF SAN FRANCISCO, CALIFORNIA.

CUTTER FOR ANGLE SHORT-CUT PASTE.

Application filed May 16, 1922. Serial No. 561,464.

*To all whom it may concern:*

Be it known that I, MARK E. FONTANA, a citizen of the United States, residing at the city and county of San Francisco, and State of California, have invented certain new and useful Improvements in Cutters for Angle Short-Cut Paste, of which the following is a specification.

My invention relates to the general class of presses in which paste is formed into macaroni and the like, by being forced through a die, and thence through guide tubes at the ends of which the paste is trimmed.

A present commercial fashion lies in putting on the market a form of short cut paste having its ends trimmed at an angle.

My invention has for its object this angular form of trimming, and it consists in the novel cutter for this purpose, which I shall hereinafter fully describe by reference to the accompanying drawings in which—

Fig. 1 is an elevation of a press provided with my novel cutter.

Fig. 2 is a vertical section, enlarged, of the cutter.

Referring to Fig. 1, which shows, in general outline, a common press used in the art, the numeral 1 is a stand supporting a frame 2 in which is mounted for revolution a pair of paste containers 3, adapted, by rotation about an axis, 3' to be successively brought under a plunger 4 operating from a cylinder 5. One paste container is exposed for filling and ramming by the ramming plunger 6, while the other container, previously filled, is in position under the plunger 4. Directly under this container is the usual forming die 7 through which paste is forced by the plunger.

Depending from the die 7, as shown in Fig. 2, are the tubes 8 through which the formed paste passes from the die. The lower ends of these tubes are fitted into the sloping sides of a hollow conical base plate 9, suitably supported on the stand 1. Against the inner inclined face of this conical plate operates a revolving inclined cutter 10 housed within the cavity of said plate. The cutter 10 is carried by a shaft 11, mounted within the hollow plate in its axis and driven by bevel gears 12 from a counter shaft 13, which is itself driven by suitable connections unnecessary herein to show.

In Fig. 2, I have shown the cutter in such position that the paste strings which had projected from the tubes on the left have had their projecting extremities trimmed off on an angle by the cutter, while those on the right, indicated by 14, still hang down in the path of the cutter and are about to be trimmed.

I claim:—

A cutter for the described purpose comprising a hollow conical plate with an open base, the sloping sides of said plate being perforated; means for guiding paste strings to and through said perforated sides from without inwardly; and a revoluble inclined cutter mounted within said plate and operating upon the inner surface of its sides to trim the inwardly projecting paste strings on an angle.

In testimony whereof I have signed my name to this specification.

MARK E. FONTANA.